US009330015B2

(12) United States Patent
Baskakov et al.

(10) Patent No.: US 9,330,015 B2
(45) Date of Patent: May 3, 2016

(54) IDENTIFICATION OF LOW-ACTIVITY LARGE MEMORY PAGES (71) Applicant: VMware, Inc., Palo Alto, CA (US)

(72) Inventors: Yury Baskakov, Newton, MA (US); Peng Gao, Boston, MA (US); Joyce Kay Spencer, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 14/302,051

(22) Filed: Jun. 11, 2014

(65) Prior Publication Data
US 2015/0363325 A1 Dec. 17, 2015

(51) Int. Cl.
G06F 12/08 (2006.01)
G06F 12/10 (2016.01)
G06F 12/12 (2016.01)
G06F 9/50 (2006.01)
G06F 9/455 (2006.01)

(52) U.S. Cl.
CPC ........ *G06F 12/1009* (2013.01); *G06F 9/45558* (2013.01); *G06F 9/5077* (2013.01); *G06F 12/1027* (2013.01); *G06F 12/12* (2013.01); G06F 2212/652 (2013.01); G06F 2212/657 (2013.01)

(58) Field of Classification Search
CPC . G06F 12/1009; G06F 12/1027; G06F 12/12; G06F 9/5077; G06F 9/45558; G06F 2212/652; G06F 2212/657
See application file for complete search history.

(56) References Cited

U.S. PATENT DOCUMENTS

| 5,526,504 | A | 6/1996 | Hsu et al. | |
|---|---|---|---|---|
| 5,617,554 | A | 4/1997 | Alpert et al. | |
| 8,914,600 | B2 * | 12/2014 | Rubowitz | G06F 12/0246 711/103 |
| 2006/0288187 | A1 * | 12/2006 | Burugula | G06F 12/1081 711/171 |
| 2008/0288742 | A1 * | 11/2008 | Hepkin | G06F 12/1009 711/201 |
| 2011/0038203 | A1 * | 2/2011 | Camp | G11C 16/3418 365/185.02 |
| 2011/0040930 | A1 * | 2/2011 | Shin | G06F 12/0246 711/103 |
| 2011/0271070 | A1 * | 11/2011 | Worthington | G06F 12/1009 711/165 |
| 2012/0011504 | A1 | 1/2012 | Ahmad et al. | |
| 2012/0155067 | A1 * | 6/2012 | Jensen | H02S 20/00 362/183 |
| 2012/0191937 | A1 * | 7/2012 | Feldman | G06F 12/0253 711/170 |
| 2013/0111171 | A1 * | 5/2013 | Hirezaki | G06F 3/0605 711/165 |
| 2013/0151756 | A1 * | 6/2013 | Tofano | G06F 3/0679 711/103 |
| 2013/0326109 | A1 | 12/2013 | Kivity | |
| 2014/0136773 | A1 * | 5/2014 | Michalak | G06F 3/0655 711/105 |
| 2014/0152684 | A1 | 6/2014 | Nystad et al. | |
| 2014/0281260 | A1 * | 9/2014 | Peterson | G06F 3/0616 711/135 |
| 2014/0359241 | A1 * | 12/2014 | Dell | G06F 12/02 711/165 |

OTHER PUBLICATIONS

U.S. Appl. No. 13/935,382, filed Jun. 3, 2013.
(Continued)

*Primary Examiner* — Hiep Nguyen (57) ABSTRACT

Large pages that may impede memory performance in computer systems are identified. In operation, mappings to selected large pages are temporarily demoted to mappings to small pages and accesses to these small pages are then tracked. For each selected large page, an activity level is determined based on the tracked accesses to the small pages included in the large page. By strategically selecting relatively low activity large pages for decomposition into small pages and subsequent memory reclamation while restoring the mappings to relatively high activity large pages, memory consumption is improved, while limiting performance impact attributable to using small pages.

20 Claims, 7 Drawing Sheets (56) References Cited

OTHER PUBLICATIONS

Navarro et al. "Practical, Transparent Operating System Support for Superpages," ACM SIGOPS Operating Systems Review—OSDI '02: Proceedings of the 5th symposium on Operating systems design and implementation, vol. 36, Winter 2002, pp. 1-16.

Romer et al., "Reducing TLB and Memory Overhead Using Online Superpage Promotion," Proceedings of the 22nd Annual International Symposium on Computer Architecture, Santa Margherita, Italy, Jun. 1995, pp. 1-5.

Office Action dated Feb. 1, 2016 for U.S. Appl. No. 14/302,069.

\* cited by examiner

IDENTIFICATION OF LOW-ACTIVITY LARGE MEMORY PAGES

CROSS-REFERENCE TO RELATED APPLICATION(S)

This application is related to the patent application entitled "Identification of Low-Activity Large Memory Pages", which is assigned to the assignee of this application and have been filed on the same day as this application.

BACKGROUND

Operating systems and hypervisors that support execution of virtual machines running in computer systems typically employ a page table translation hierarchy to manage mapping of memory from a virtual memory space to a physical memory space that is divided into pages. Each page is a block of contiguous memory addresses, but page sizes may vary between pages. When a page is mapped from an entry of a page table at the lowest level (level 1), the size of the page is the smallest size that is supported by the computer system. When a page is mapped from an entry of a page table at a higher level (level N>1), the size of the page is a larger size that is supported by the computer system. As referred to herein, "small" pages are of a smaller size than "large" pages, but small pages are not necessarily the smallest size that is supported by the computer system. Similarly, large pages are not necessarily the largest size that is supported by the computer system.

To increase the performance of applications running on the virtual machines, computer systems often employ a translation lookaside buffer (TLB) to cache mappings from virtual memory space to physical memory space. Since the size of the TLB is limited, computer systems may further optimize performance by using large pages to decrease the likelihood of TLB misses (i.e., mappings that are not stored in the TLB). However, if the available physical memory becomes scarce, then unused portions of the large pages unnecessarily waste memory and may lead to performance degradation.

In an attempt to reduce performance degradation, some hypervisors randomly select large pages for demotion to small pages as the memory becomes scarce. Such an approach allows the hypervisor to reclaim unused portions of the large pages and, thus, reduce memory pressure. However, if one or more applications are actively accessing the selected large page, the time increase required map to small pages instead of large pages may exceed the time decrease attributable to reducing the memory pressure. Consequently, the overall performance of applications may be adversely impacted.

SUMMARY

One or more embodiments provide techniques to identify activity levels of large pages in a computer system having memory that is partitioned and accessed as small pages and large pages. A method of identifying activity levels for large pages according to an embodiment includes the steps of selecting a large page that includes a group of small pages; updating mappings for the memory so that a mapping to the large page is changed to mappings to the small pages; tracking accesses to the small pages; and determining an activity level for the large page based on the accesses to the small pages.

A method of classifying an activity level for large pages in a computer system having memory that is partitioned and accessed as small pages and large pages, according to an embodiment, includes the steps of: selecting a set of large pages; for each of the large pages in the set of large pages, clearing a large page accessed bit to enable tracking of accesses to the large page from the time the large page accessed bit is cleared; scanning the large page accessed bits after a first scan period; and for each of the large pages in the set of large pages, determining a first activity level based on whether the large page accessed bit indicates that the large page has been accessed during the first scan period.

A computer system according to an embodiment includes virtual machines executed therein and a hypervisor configured to support execution of the virtual machines, wherein the hypervisor is configured to map a virtual memory space to a physical memory space that is partitioned and accessed as large pages and small pages, and to identify large pages that are relatively infrequently accessed.

Further embodiments of the present invention include a non-transitory computer-readable storage medium comprising instructions that cause a computer system to carry out one or more of the above methods as well as a computer system configured to carry out one or more of the above methods.

Advantageously, providing insight into which large pages are relatively inactive enables the computer system to intelligently select large pages for decomposition into small pages and memory reclamation. Reclaiming underutilized memory improves overall system performance and, consequently, the execution time of applications running on the computer system. By contrast, in conventional approaches to altering memory performance, large pages are indiscriminately selected for demotion and the memory performance may not be optimal.

DETAILED DESCRIPTION

Figure 1:
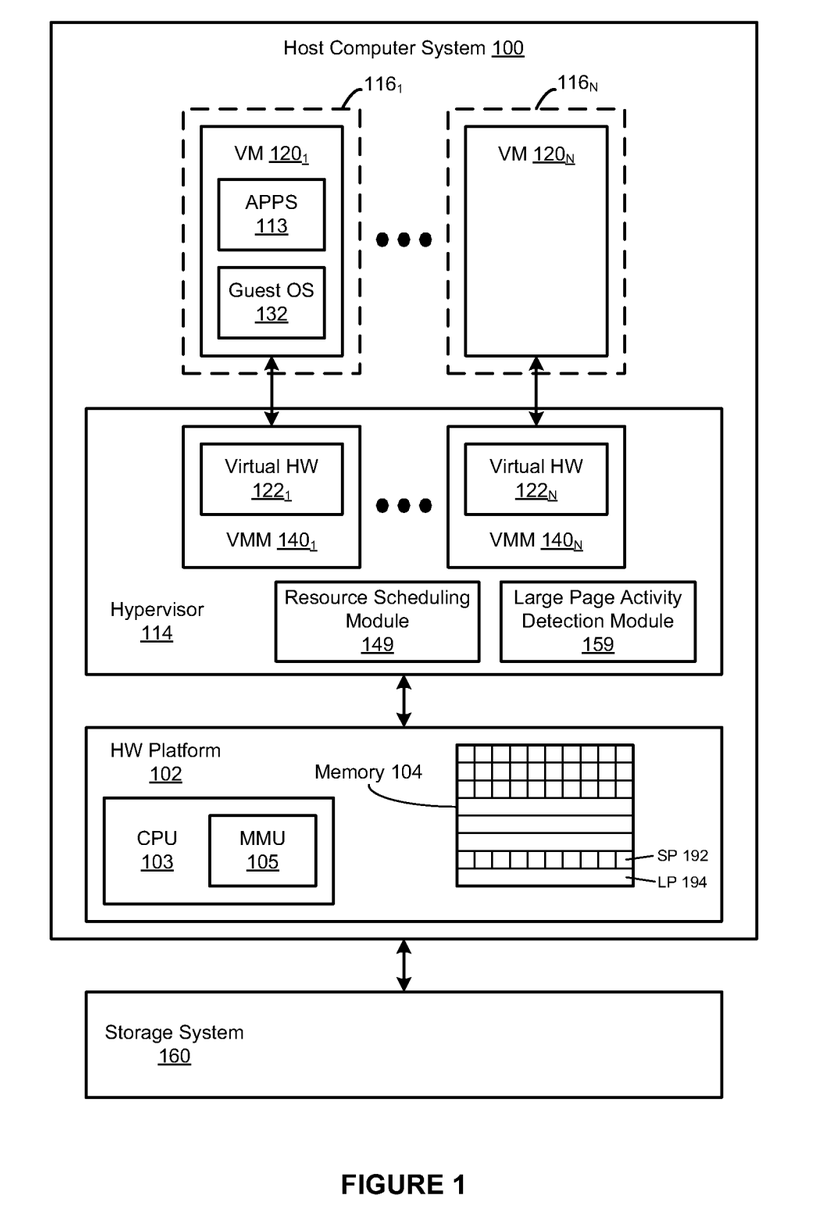
FIG. 1 is a block diagram of a virtualized computer system that is configured to identify low-activity large pages according to one or more embodiments.

FIG. 1 is a block diagram of a virtualized computer system that is configured to identify low activity large pages according to one or more embodiments. Host computer system 100 may be constructed on a desktop, laptop or server grade hardware platform 102, such as an x86 architecture platform. Hardware platform 102 includes one or more central processing units (CPU) 103, host physical memory 104, and other standard hardware components such as network interface controllers (not shown) that connect host computer system 100 to a network and one or more host bus adapters (not shown) that connect host computer system 100 to a persistent storage device, illustrated herein as storage system 160.

A hypervisor 114 is installed on top of hardware platform 102. Hypervisor 114 supports multiple virtual machine (VM) execution spaces $116_1$-$116_N$, within each of which a VM process is executed to instantiate corresponding VMs $120_1$-$120_N$. For each of VMs $120_1$-$120_N$, a resource scheduling module 149 of hypervisor 114, which includes a CPU scheduling module and a memory scheduling module, manages a corresponding virtual hardware platform (i.e., virtual hardware platforms $122_1$-$122_N$) that includes emulated hardware such as virtual CPUs (vCPUs) and guest physical memory. Each virtual hardware platform 122 supports the installation of a guest operating system (OS) (e.g., guest OS 132). In each instance, the guest OS provides user-level applications running in the virtual machine, e.g., APPS 113, an interface to the virtual hardware platform of the virtual machine.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware's vSphere product, which is commercially available from VMware, Inc. of Palo Alto, Calif. It should further be recognized that other virtualized computer systems are contemplated, such as hosted virtual machine systems, where the hypervisor is implemented in conjunction with a host operating system.

CPU 103 has a memory management unit (MMU) 105 that carries out the mappings from a virtual address space of VMs $120_1$-$120_N$ or any other applications running on hypervisor 114 to a physical address space of memory 104 (referred to herein as the "host physical address space") using either a translation lookaside buffer (not shown) or page tables (not shown in FIG. 1) stored in memory 104. In embodiments using shadow page tables to map guest virtual address spaces within VMs $120_1$-$120_N$ directly to the physical address space of memory 104, the virtual address space of VMs $120_1$-$120_N$ referred to herein corresponds to one of the guest virtual address spaces within VMs $120_1$-$120_N$, and the page tables referenced herein correspond to the shadow page tables. In embodiments using extended or nested page tables where guest virtual address spaces within VMs $120_1$-$120_N$ are mapped to a guest physical address space using guest pages tables and the guest physical address space is mapped to the host physical address space using extended or nested page tables, the virtual address space of VMs $120_1$-$120_N$ referred to herein corresponds to the guest physical address space and the page tables referenced herein correspond to the extended or nested page tables. The mappings may be to a small page (SP) 192 in memory 104 or a large page (LP) 194 in memory 104. In the x86 architectures, the typical size for small pages is 4 KB and the typical size for large pages is 2 MB. However, it should be recognized that embodiments may be practiced with different small page sizes and different large page sizes.

Although employing large pages 194 typically improves performance, the use of large pages 194 also leads to increased consumption of the memory 104. For this reason, embodiments provide a large page activity detection module 159 that is programmed to identify large pages 194 that are relatively infrequently accessed, referred to herein as "cold" large pages 194. These identified cold large pages 194 provide opportunities to strategically break apart large pages 194 that hinder memory performance without compromising large pages 194 that optimize memory performance.

Large page activity detection module 159 is configured to identify cold large pages 194 at any level L>1 in the page table hierarchy. In some embodiments, large page activity detection module 159 is configured to determine a "temperature" representing the usage of one or more large pages 194 at discrete time intervals or over multiple time intervals. In such embodiments, the temperature of large page 194 gradually increases from cold to hot as applications access large page 194. Inputs to large page activity detection module 159 include, without limitation, number of large pages 194 for evaluation, frequency of evaluation, and an asynchronous evaluation trigger. Outputs of large page activity detection module 159 guide any number of additional modules, such as resource scheduling module 149, to optimize the resources of host computer system 100 and performance of applications executing on VMs 120.

Figure 2A:
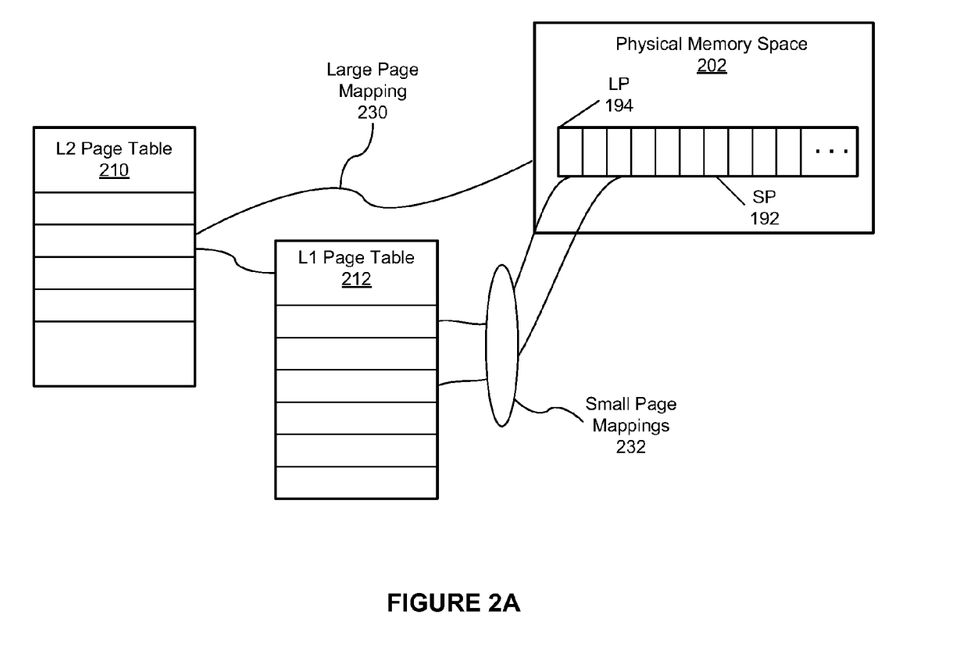
FIGS. 2A and 2B are conceptual diagrams that illustrate a page table translation hierarchy that translates guest physical addresses to host physical addresses in physical memory space according to one or more embodiments.
Figure 2B:
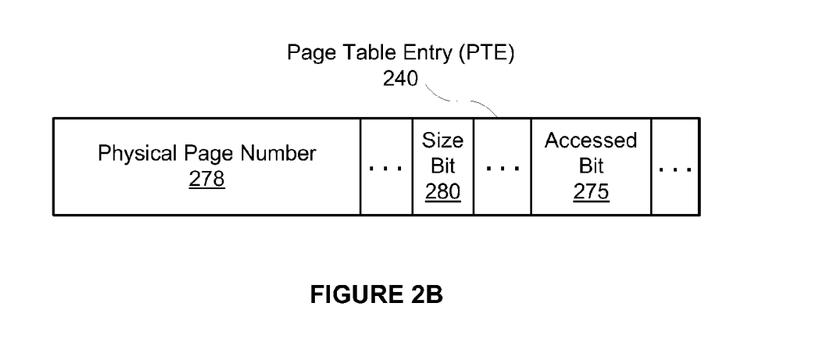

FIGS. 2A and 2B are conceptual diagrams that illustrate a page table translation hierarchy that translates guest physical addresses to host physical addresses in physical memory space 202 according to one or more embodiments. The exemplary page table translation hierarchy depicted in FIGS. 2A and 2B includes a level 1 (L1) page table 212 and a level 2 (L2) page table 210. L1 page table 212 is at the lowest level of the page table translation hierarchy, and L2 page table 210 is at the next level up from L1 page table 212 in the page table translation hierarchy. Both L1 page table 212 and L2 page table 210 include page table entries (PTEs) 240. Each PTE 240 includes, inter alia, a physical page number (PPN) 278, a size bit 280, and an accessed bit 275. It should be understood that FIGS. 2A and 2B illustrate one possible configuration of a page table translation hierarchy and bits in PTE 240, and the number and arrangement of elements in the page table translation hierarchy and PTE 240 can be varied from what is shown.

PPN 278 indicates the next page in the page table translation hierarchy. If PTE 240 is at the lowest level of the page table translation hierarchy, then PPN 278 corresponds to a data page. Size bit 280 is a bit that is set to zero when the corresponding PTE 240 is the lowest level of the page table translation hierarchy. Since the size of the pages may vary within the memory 104, size bit 280 may be set to zero in PTEs 240 at various levels in the page table translation hierarchy. In this fashion, one or more levels in the page table hierarchy are not traversed when addressing large pages and, consequently, memory accesses are streamlined. Accessed bit 275 indicates whether the page at PPN 278 was accessed since the accessed bit 275 was previously cleared. In operation, when data is written to or read from memory 104, accessed bits 275 of PTEs 240 corresponding to a page in memory 104 that is being written to or read from is set (assigned a value of one). Various modules, such as large page activity detection module 159 and resource scheduling module 149, clear accessed bits 275 as part of monitoring operations.

When a page in physical memory space 202 is mapped small, the hypervisor 114 creates a small page mapping 232 that links the corresponding PTE 240 in L1 page table 212 to small page 192 in memory 104. By contrast, when a page in physical memory space 202 is mapped large, the hypervisor 114 creates a large page mapping 230 that links the corresponding PTE 240 in L2 page table 210 to large page 194 in memory 104 and then updates PTE 240 to indicate that there is no mapped L1 page table 212. This update includes modifying the size bit 280 appropriately. Various modules within hypervisor 114 update small page mappings 232 and large page mappings 230.

One embodiment of large page activity detection module 159 leverages PTEs 240 to monitor activity of a sample subset of large pages 194 at the granularity of small pages 192. To identify cold large pages 194 at a level N, large page activity detection module 159 selects a sample subset of large pages 194 at level N for temporary mapping demotion to level N−1. Large page activity detection module 159 selects the sample subset of large pages 194 using any method as known in the art. In some embodiments, large page activity detection module 159 randomly selects the sample subset of large pages 194. In one embodiment, to identify cold large pages 194 at level 2, large page activity detection module 159 disables large page mapping 230 for the PTEs 240 corresponding to large pages 194 in the sample subset and creates small pages mappings 232 for each small page 192 included in these large pages 194. Because one or more large pages 194 in the sample subset may be relatively active and thus a poor candidate for disassembly, large page activity detection module 159 preserves the continuity of memory 104 backing large pages 194 in the sample subset. In one embodiment, large page activity detection module 159 inhibits host computer system 100 from freeing memory 104 backing large pages 194 in the sample set. In this fashion, large page activity detection module 159 ensures that the level N−1 page table is not bypassed during memory mapping for large pages 194 in the sample subset without prematurely perturbing memory 104.

Large page activity detection module 159 performs the monitoring operations in any technically feasible fashion that is consistent with monitoring at the granularity of small pages 192. In various embodiments, large page activity detection module 159 may monitor accessed bits 275 in level N−1 PTEs 240, track page faults to level N−1 pages 192, perform access traces at level N−1, etc. Further, large page activity detection module 159 may perform such monitoring operations in any combination in any fashion that yields deterministic insight into accesses to small pages 192 included in large pages 194 in the sample subset.

In some embodiments, to optimize monitoring operations across hypervisor 114, large page activity detection module 159 is programmed to combine the sampling-based large page 194 activity detection described herein with active working set estimation. In such embodiments, the sample subset of large pages 194 is selected to encompass the sampled small pages 192 used for active working set estimation. In general, the functionality of large page activity detection module 159 may be subsumed into other modules, partitioned amongst other modules, and/or modified to support additional sampling-based algorithms.

After appropriately initializing the monitoring method, large page activity detection module 159 monitors accesses to the small pages 192 included in the large pages 194 in the sample subset for a predetermined evaluation time period. During the evaluation time period, large page activity detection module 159 prohibits the re-promotion of the temporarily mapping-demoted large pages 194 in the sample subset. Subsequently, for each large page 194 included in the sample subset, large page activity detection module 159 composites the observed accesses of small pages 192 included in large page 194 to determine the overall activity of large page 194. In some embodiments, large page activity detection module 159 processes the results from a single evaluation time period in isolation. In other embodiments, large page activity detection module 159 monitors accesses over multiple evaluation time periods and determines the overall activity of large pages 194 in the sample subset based on small page 192 activity results from multiple evaluation time periods.

In one embodiment, large page activity detection module 159 compares the number of observed accesses to a hot threshold. If the number of observed accesses to small pages 192 included in large page 194 meets or exceeds a hot threshold, then the large page activity detection module 159 removes small page mappings 232 associated with large page 194 and restores the corresponding large page mapping 230. However, if the number of observed accesses to small pages 192 included in large page 194 is less than the hot threshold, then large page activity detection module 159 identifies large page 194 as a cold large page 194. By identifying cold large page 194 in this fashion, large page activity detection module 159 provides insight into which large pages 194 are most likely to yield performance benefits when broken into small pages 192. This insight enables hypervisor 114 to fine-tune the allocation and partitioning of memory 104.

In general, hot large pages 194 are only hot for a certain arbitrary time span, and may cool and become cold large pages 194 over time. Consequently, large page activity detection module 159 is programmed to repeatedly identify new cold large pages 194 over time. In some embodiments, large page activity detection module 159 periodically selects a new sample subset of large pages 194, monitors the small pages 192 included in these large pages 194, and identifies cold large pages 194 from the new sample subset of large pages 194. The frequency at which large page activity detection modules 159 initiates such a new cold large page identification cycle may be determined in any technically feasible fashion and may be based on various metrics, such as available memory 104. In some embodiments, large page activity detection module 159 is configured to initiate a new cold large page identification cycle when the number and/or frequency of TLB misses exceed a predetermined threshold.

In some embodiments, large page activity detection module 159 incrementally processes memory access data for small pages 192 during evaluation time periods. If large page activity detection module 159 determines that a particular large page 194 is relatively active (i.e. "hot"), then the large page activity detection module 159 restores the original mappings for hot large page 194 before the end of the evaluation time period. More specifically, large page activity detection module 159 removes small pages mappings 232 associated with hot large page 194 and restores large page mapping 230 associated with hot large page 194 before the predetermined evaluation period of time has elapsed.

Another embodiment of large page activity detection module 159 leverages accessed bits 275 in PTEs 240 of large pages 194 to monitor activity at the granularity of large pages 194. Large page activity detection module 159 initializes and then performs read operations on accessed bits 275 of PTEs 240 corresponding to large pages 194 over one or more scan periods to identify which large pages 194 have been accessed. Subsequently, large page activity detection module 159 characterizes the activity level of each large page 194 based on the identified accesses. Large page activity module 159 may characterize activity of large pages 194 in a binary fashion— an un-accessed large page 194 is characterized as cold, whereas an accessed large page 194 is characterized as hot. Alternatively, large page activity module 159 may characterize activity of large pages 194 using a finite state machine approach in which large page activity detection module 159 stores access data for each scan period and subsequently incorporates this stored data into future activity gradient calculations.

Monitoring activity of large pages 194 at the granularity of small pages 192 is both more time consuming and more accurate than monitoring activity of large pages 194 at the granularity of large pages 194. Consequently, some embodiments of large page activity detection module 159 perform sample-based small page 192 granularity monitoring in conjunction with more extensive large page 194 granularity monitoring. In such embodiments, large page activity detection module 159 is programmed to optimize accuracy without jeopardizing convergence to a set of cold large pages 194 that may, upon demotion to small pages 192, improve the performance of host computer system 100.

Figure 3A:
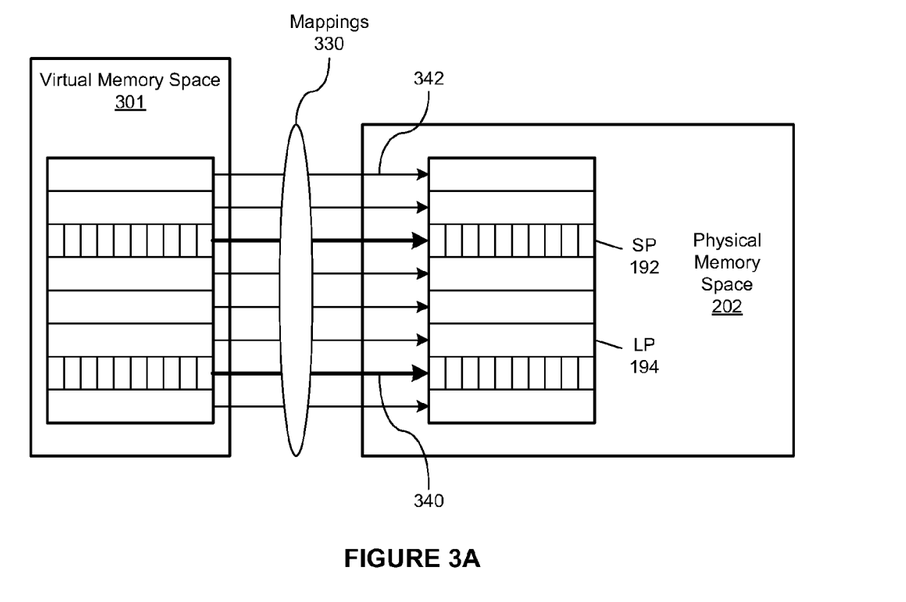
FIGS. 3A and 3B are conceptual diagrams that illustrate mappings of small pages and large pages from a virtual memory space to physical memory space according to one or more embodiments.
Figure 3B:
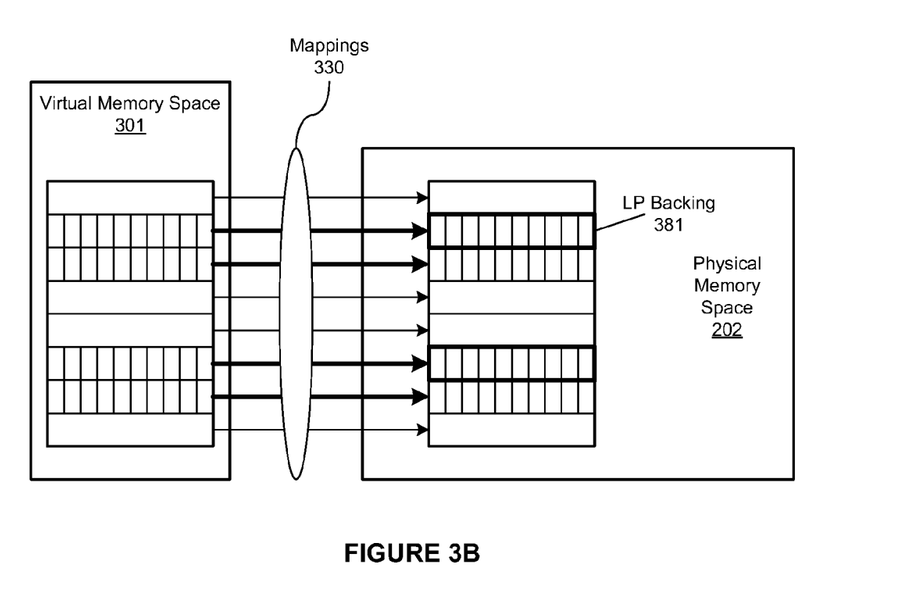

FIGS. 3A and 3B are conceptual diagrams that illustrate mappings 330 of small pages 192 and large pages 194 from a virtual memory space 301 to physical memory space 202. Physical memory space 202 corresponds to the host physical memory space. Embodiments depicted in FIGS. 3A and 3B use extended or nested page tables where guest virtual memory spaces within VMs $120_1$-$120_N$ are mapped to a guest physical memory space using guest pages tables and the guest physical memory space is mapped to physical memory space 202 using extended or nested page tables. In such embodiments, virtual memory space 301 corresponds to the guest physical address space. Some alternate embodiments use shadow page tables to map guest virtual memory spaces within VMs $120_1$-$120_N$ directly to physical memory space 202. In these alternate embodiments, virtual memory space 301 corresponds to one of the guest virtual memory spaces within VMs $120_1$-$120_N$. Small page mappings 232 are indicated by a single thick arrow (e.g., arrow 340). It should be understood that each small page in virtual memory space 301 on the left side of this arrow is mapped to a corresponding small page in physical memory space 202 on the right side of this arrow. Each large page mapping 230 is indicated by a thinner arrow (e.g., arrow 342).

FIG. 3A shows the state of mappings 330 prior to large page activity detection module 159 executing a cold large page identification cycle. FIG. 3B shows the state of mappings 330 after large page activity detection module 159 has identified and prepared a sample subset of large pages 194 for monitoring. As shown, large page activity detection module 159 has converted mappings 330 for large pages 194 in a sample subset from large page mappings 230 to small page mappings 232. Further, large page activity detection module 159 has preserved the continuity of the memory 104 backing large pages 194 included in the sample subset. Large page backings 381 are indicated by boxes with thick boundaries.

Figure 4A:
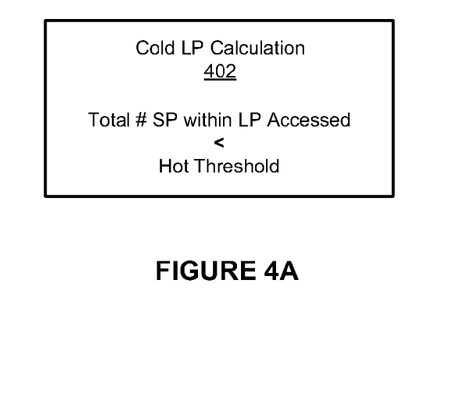
FIGS. 4A and 4B are conceptual diagrams that illustrate identification of low-activity large pages according to one or more embodiments.
Figure 4B:
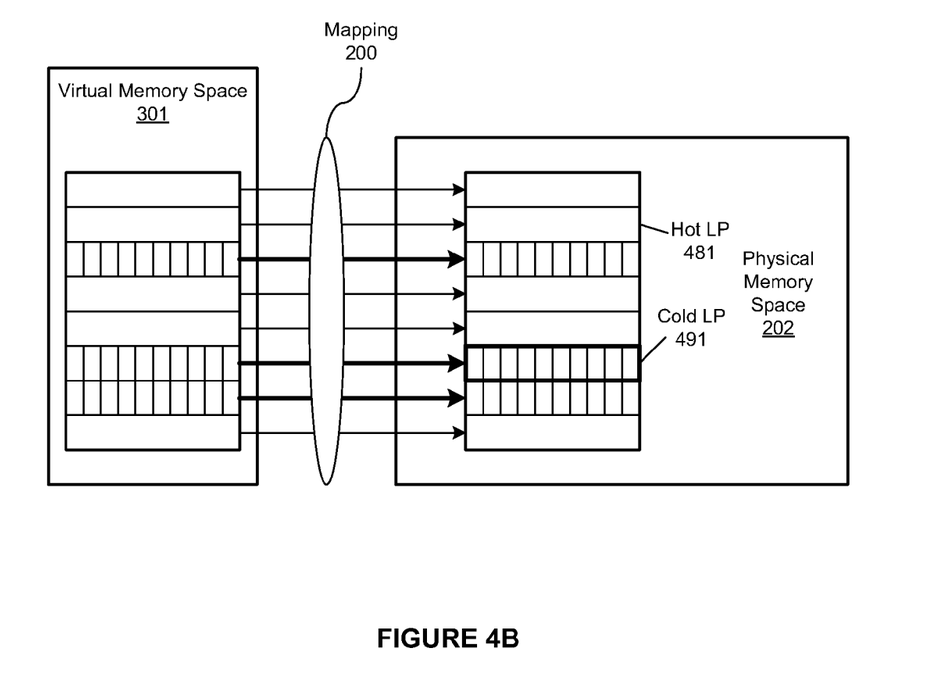

FIGS. 4A and 4B are conceptual diagrams that illustrate identification of low-activity large pages according to one or more embodiments. During a cold large page identification cycle, large page activity detection module 159 applies one or more activity determination heuristics to observed accesses of small pages 192 included in large pages 194 in the sample subset. FIG. 4A shows one such heuristic—a cold large page calculation 402. For each large page 194 in the sample subset, large page activity detection module 159 applies cold large page calculation 402 to the small pages 192 included in the large page 194. If the total number of small pages 192 included in the large page 194 that were accessed during the evaluation period meet or exceed a hot threshold, then large page activity detection module 159 identifies large page 194 as a hot large page 481. If the number of small pages 192 included in the large page 194 that were accessed during the evaluation period are less than the hot threshold, then large page activity detection module 159 identifies large page 194 as a cold large page 491.

FIG. 4B shows the state of mappings 330 after large page activity detection module 159 has categorized large pages 194 in the sample subset as either hot large pages 481 or cold large pages 491. Large page activity detection module 159 has restored the mappings 330 for hot large page 481 to the state of mappings 330 prior to the cold large page identification cycle. However, large page activity detection module 159 has not restored mappings 330 for cold large page 491 to the state of mappings 330 prior to the cold large page identification cycle. To expedite the process of removing large page backing 381 and splitting cold large pages 491 into small pages 192, large page activity detection module 159 retains small pages mappings 232 for cold large pages 491 and notifies hypervisor 114 of the suitability of cold large pages 491 for breakage and subsequent memory reclamation.

Figure 5:
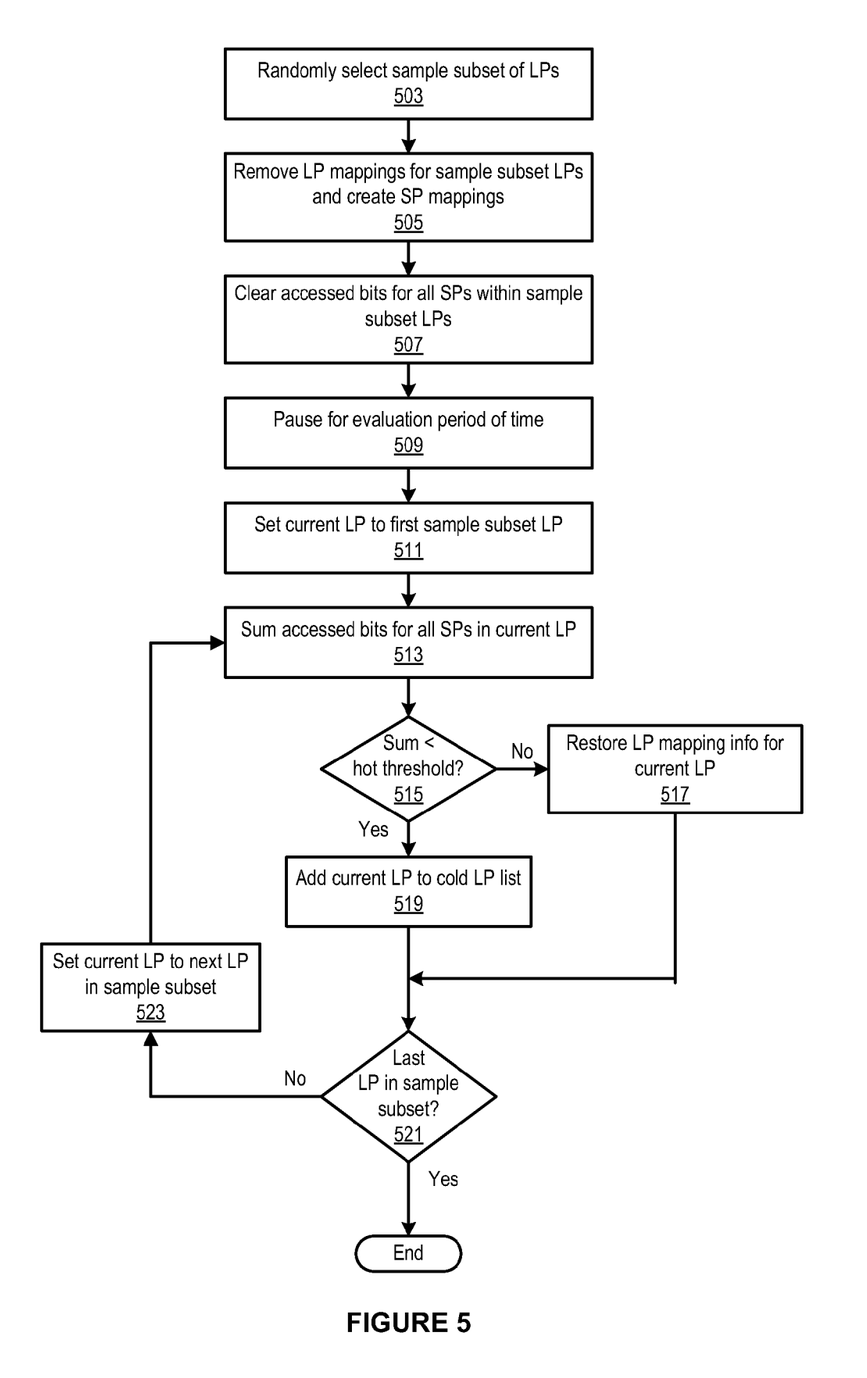
FIG. 5 depicts a flow diagram that illustrates a method that includes the steps of identifying low-activity large pages based on sampling, according to an embodiment.

FIG. 5 depicts a flow diagram that illustrates a method that includes the steps of identifying low-activity large pages based on sampling, according to an embodiment. In the embodiment illustrated herein, large page activity detection module 159 is conducting a single cold page identification cycle on a subset of large pages 194. Large page activity detection module 159 may subsequently conduct additional cold page identification cycles on additional sample subsets of large pages 194. Additional cold pages identification cycles may be triggered in any technically feasible fashion, such as excessive TLB misses or anticipated strain on memory 104.

This method begins at step 503 where large page activity detection module 159 randomly selects a sample subset of large pages 194 for evaluation. At step 505, large page activity detection module 159 removes large page mappings 230 for large pages 194 in the sample subset, and creates small page mappings 232 for each small page 192 included in large pages 194 in the sample subset. As part of step 505, large page activity module 159 updates size bits 280 in page table entries 240 for large pages 194 in the sample subset to indicate the finer granularity of mapping. In one embodiment, large page activity detection module 159 preserves both large page mappings 230 and large page backings 381 (i.e., contiguous physical addresses in memory 104) to expedite potential mapping re-promotion.

At step 507, large page activity detection module 159 clears accessed bit 275 in page table entries 240 for each small page 192 that is included in large pages 194 in the sample subset. At step 509, large page activity detection module 159 pauses for a set amount of time—the evaluation time period—and the host computer system 100 continues operating with accessed bit tracking enabled. The duration of the evaluation time period may be adjusted according to the state of memory 104.

After the evaluation time period, at step 511, large page activity detection module 159 sets a current large page 194 to the first large page 194 in the sample subset. At step 513, large page activity detection module 195 performs comparison and addition operations that determine the total number of accessed bits 275 in page table entries 240 for small pages 192 included in current large page 194. This current total number of accessed bits 275 represents the total number of small pages 192 included in current large page 194 that were accessed during the evaluation time period. At step 515, if large page activity detection module 159 determines that the current total number of accessed bits 275 meets or exceeds a hot threshold, then large page activity detection module 195 restores large page mapping 230 and size bit 280 information in page table entry 240 for current large page 194 (step 517) to reflect typical large page 194 mapping, and step 519 is skipped. If, at step 515, large page activity detection module 159 determines that the current total number of accessed bits 275 does not exceed the hot threshold, then step 517 is skipped and large page activity detection module 159 adds current large page 194 to a list of cold large pages 491 (step 519).

The hot threshold is a number that represents the minimum number of active small pages 192 within large page 194 for that large page 194 to be maintained as a large page without likely reducing the performance of computer system 100. In some embodiments, the hot threshold equals one. In such embodiments, a single access to a single small page 192 within large page 194 during the evaluation time period is sufficient to prevent large page 194 from being broken into small pages 192. In some embodiments, the hot threshold is adjusted upwards or downwards based on the availability of memory 104. If memory 104 is lightly utilized, then hot threshold is adjusted downwards. If memory 104 is heavily utilized, then hot threshold is adjusted upwards.

At step 521, if large page activity detection module 159 determines that there are un-processed large pages 194 in the sample subset, then large page activity detection module 159 sets the current large page 194 to the next large page 194 in the sample subset (step 523). Large page activity detection modules 159 then re-executes steps 513-523 until large page activity detection module 159 has processed all large pages 194 in the sample subset. When large page activity detection module 159 processes the last large page 194 in the sample subset, then large page activity detection module 159 transmits the list of cold large pages 491 to hypervisor 114 to guide efforts to optimize usage of memory 104. Such efforts may include breaking apart cold large pages 491 and then repurposing previously wasted portions of memory 104.

Figure 6:
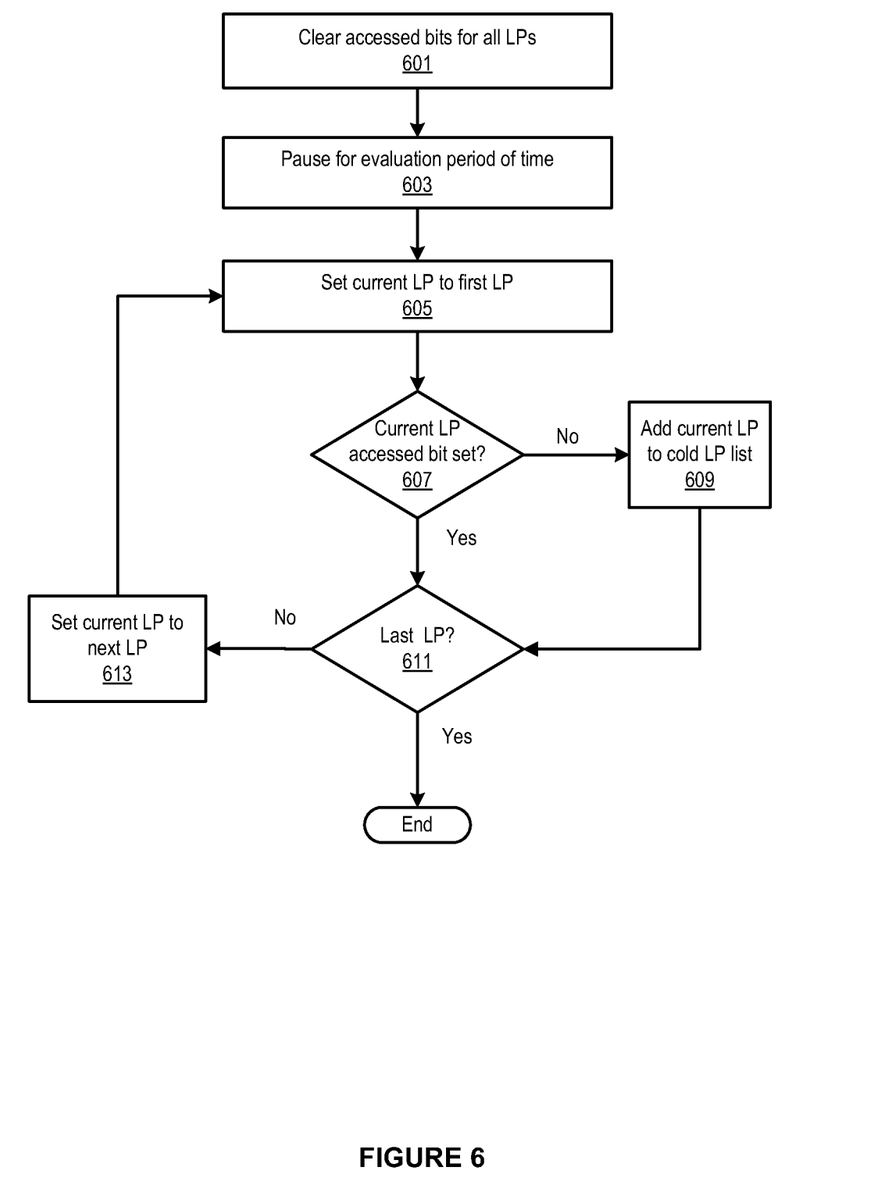
FIG. 6 depicts a flow diagram that illustrates a method that includes the steps of identifying low-activity large pages based on accessed bits, according to an embodiment.

FIG. 6 depicts a flow diagram that illustrates a method that includes the steps for identifying low-activity large pages based on accessed bits, according to an embodiment. In the embodiment illustrated herein, large page activity detection module 159 is evaluating a complete set of large pages 194 backing virtual memory space 301. Further, large page activity module 159 re-evaluates this complete set of large pages 194 on a periodic basis. The rate at which this method is executed may be adjusted according to the state of memory 104. For example, as memory 104 becomes scarce as determined by resource scheduling module 149, this rate is increased. Conversely, as memory 104 becomes more plentiful as determined by resource scheduling module 149, this rate is decreased.

In some embodiments, large page activity detection module 159 includes a rescan signal. If the rescan signal is asserted, then large page activity module 159 re-executes this method. For example, when one or more virtual machines 120 become idle, hypervisor 114 may assert the rescan signal to reclaim memory 104 that is now unused.

This method begins at step 601 where large page activity detection module 159 clears accessed bit 275 in page table entries 240 of all large pages 194. At step 603, large page activity detection module 159 pauses for a set amount of time—the evaluation time period—and the host computer system 100 continues operating with accessed bit tracking enabled. The duration of the evaluation time period may be adjusted according to the state of memory 104.

After the evaluation time period, at step 605, large page activity detection module 159 sets a current large page 194 to the first large page 194. Large page activity detection module 159 then performs one or more read operations to determine whether accessed bit 275 in page table entry 240 for current large page 194 is set. A set accessed bit 275 indicates that current large page 194 was accessed during the evaluation time period. At step 607, if large page activity detection module 159 determines that current large page 194 was not accessed during the evaluation time period, then large page activity detection module 159 adds current large page 194 to a list of cold large pages 491 (step 609), and the method proceeds to step 611. If, at step 607, large page activity detection module 159 determines that current large page 194 was accessed during the evaluation period, then large page activity detection module 159 skips step 609, and the method proceeds directly to step 611.

At step 611, if large page activity detection module 159 determines that there are un-processed large pages 194, then large page activity detection module 159 sets the current large page 194 to the next large page 194 (step 613). Large page activity detection modules 159 then re-executes steps 605-613 until large page activity detection module 159 has processed all large pages 194. In some embodiments, after large page activity detection module 159 processes the last large page 194 in the sample subset, then large page activity detection module 159 transmits the list of cold large pages 491 to hypervisor 114 to guide efforts to optimize usage of memory 104. Such efforts may include breaking apart cold large pages 491 included in the list of cold large page 491 and releasing unused portions of memory 104. In other embodiments, data from multiple executions of this method are composited to determine a temperature range for each large page 194. In such embodiments, large pages 194 will be ranked based on relative temperatures and one or more selection criteria, and then broken up in order based on their ranks until the amount of free memory 104 is greater than a pre-defined minimum free memory.

In alternate embodiments, large page activity detection module 159 partitions the complete set of large pages 194 into multiple subsets of large pages 194 prior to performing this method. In such embodiments, large page activity detection module 159 selects a subset of large pages 194, executes this method for the selected subset of large pages 194, selects another subset of large pages 194, executes this method for the selected subset of large pages 194, etc. In such embodiments, at step 601, large page activity module 159 clears accessed bit 275 in page table entries for the large pages 194 included in the selected subset of large pages 194 instead of the complete set of large pages 194. And large page activity module 159 performs steps 605-613 for the large pages 194 included in the selected subset of large pages 194. The selection of large pages 194 for the subsets and the processing order of the subsets may be determined in any technically feasible fashion, such as random, sequential, or feedback driven.

Figure 7:
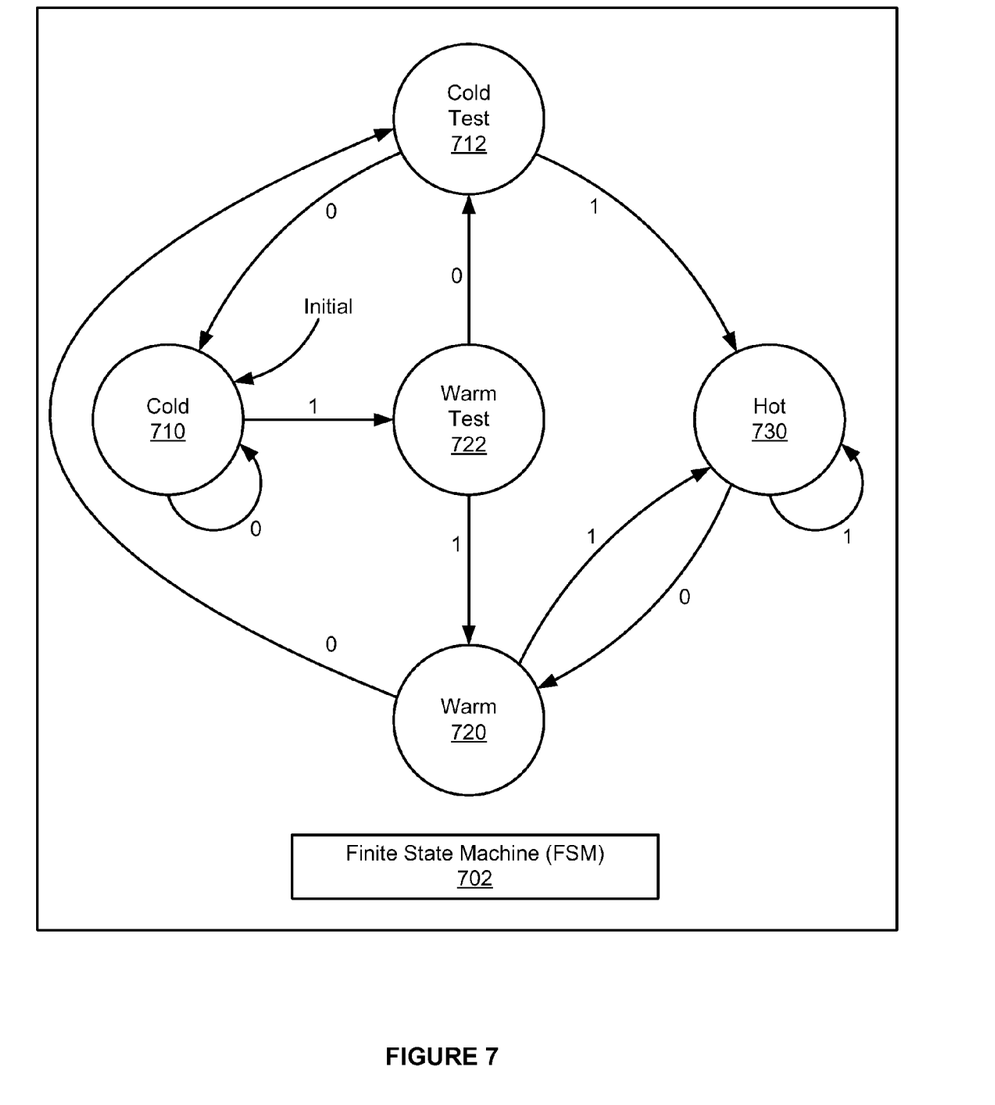
FIG. 7 illustrates a finite state machine (FSM) for classifying the activity level of large pages, according to an embodiment.

FIG. 7 illustrates a finite state machine (FSM) 702 for classifying the activity level of large pages 194 according to an embodiment. In operation, FSM 702 is configured to periodically update state information specific to large page 194. The updated state information is based on: (1) the current state of large page 194, and (2) current accessed bit 275 of large page 194, either or both of which would be set if large page 194 was accessed since a most recent sample was taken. An access history with respect to real time for large page 194 is therefore represented as an FSM 702 state corresponding to large page 194. A history of repeated recent access to large page 194 suggests that large page 194 is relatively active and will likely be accessed again in the near future, while a history of no access to large page 194 suggests that large page 194 is relatively inactive and will likely not be accessed in the near future. In some embodiments, hypervisor 114 breaks relatively inactive large pages 194 into small pages 192 and then performs one or more memory reclamation operations (e.g., page sharing, swapping, memory compression, etc.).

FSM 702 includes five states, including a cold 710, a cold test 712, a warm 720, a warm test 722, and a hot 730. State transitions are determined based on accessed bit 275 value of either zero "0" or one "1." A state transition arc from each state for each of "0" or "1" is shown. For example, in cold state 710, accessed bit 275 value "0" results in FSM 702 transitioning back to cold state 710, while accessed bit 275 value "1" results in FSM 702 transitioning to warm test state 722. It should be recognized that accessed bit 275 may be replaced by other types of status information as an input to FSM 702, and plural instances of FSM 702 may be simultaneously implemented to respond to different types of status information simultaneously without departing the scope of the present invention.

As shown, hot state 730 is reached from either three successive accessed bit 275 values "1" being sampled in a row {1,1,1}, or accessed bit 275 value "1" being sampled followed by a "0" followed by another "1" {1,0,1}. Once FSM 702 is in hot state 730, any "0" subsequently encountered will cause FSM 702 to transition to warm state 720. However, a subsequent "1" will cause a transition back to hot state 230. Each possible transition is illustrated in FIG. 7. As shown, cold state 710 is the initial state of FSM 702. The activity level of large page 194 is directly represented by the present state of FSM 200. Hot state 730 represents a maximum activity level, while cold state 710 represents a minimum activity level. Intermediate activity levels are represented by warm state 720, warm test state 722, and cold test state 712.

In some embodiments, the methods of FIGS. 5 and 6 may be combined such that large page activity detection module 159 carries out the method of FIG. 5 for the large pages that are selected for evaluation at step 503 and the method of FIG. 6 for some or all of the remaining large pages.

Certain of the foregoing embodiments relate to selectively breaking cold large memory pages into small memory pages. This also allows more small pages proactively reclaimed via page sharing.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of identifying an activity level for large pages in a computer system having memory that is partitioned and accessed as small pages and large pages, comprising:

selecting a large page that includes a group of small pages;
updating mappings for the memory so that a mapping to the large page is changed to mappings to the small pages;

tracking accesses to the small pages; and determining an activity level for the large page based on the accesses to the small pages.

2. The method of claim 1, wherein the determining is based on the total number of different small pages in the group that have been accessed during a fixed duration of time.

3. The method of claim 1, wherein the determining is based on the total number of accesses to any one of the small pages in the group during a fixed duration of time.

4. The method of claim 1, wherein the tracking is based on at least one of page faults, memory traces, and accessed bits.

5. The method of claim 1, further comprising inhibiting the computer system from disrupting the continuity of the physical memory backing the large page.

6. The method of claim 1, wherein the updating mappings comprises removing the mapping to the large page from a page table that is used by the computer system to map to the pages of the memory.

7. The method of claim 1, wherein the size of the small page is the smallest page size supported by the computer system and the size of the large page is N times larger than the smallest page size, where N is an integer greater than 1.

8. The method of claim 1, further comprising:

determining the activity level of the large page to be lower than a predetermined threshold;

breaking apart the large page into the small pages in the group; and releasing the memory backing at least one of the small pages in the group.

9. The method of claim 1, further comprising:

determining the activity level of the large page to be higher than a predetermined threshold; and updating mappings for the memory so the mappings to the small pages is replaced by the mapping to the large page.

10. The method of claim 1, wherein determining the activity level comprises performing one or more comparison operations between the accesses to the small pages and one or more predetermined thresholds.

11. The method of claim 1, wherein the activity level is determined based on a currently stored activity level of the large page and the accesses to the small pages, and further comprising storing the activity level.

12. The method of claim 1, further comprising performing one or more operations on a sample page included in the group of small pages to estimate an active working set.

13. The method of claim 12, wherein the one or more operations are based on the accesses to the sample page.

14. The method of claim 12, wherein the large page is selected based on the sample page.

15. The method of claim 1, wherein a group of large pages are selected randomly and said updating, tracking, and determining are carried out for each of the large pages.

16. The method of claim 15, further comprising:

selecting a plurality of large pages that are not in the group of large pages selected randomly;

for each of the large pages in the selected plurality of large pages, clearing a large page accessed bit to enable tracking of accesses to the large page from the time the large page accessed bit is cleared;

scanning the large page accessed bits of the large pages in the selected plurality of large pages after a first scan period; and for each of the large pages in the selected plurality of large pages, determining an activity level for the large page based on whether the large page accessed bit indicates that the large page has been accessed during the first scan period.

17. A non-transitory computer-readable storage medium comprising instructions, which when executed in a computer system having memory that is partitioned and accessed as small pages and large pages, causes the computer system to carry out the steps of:

selecting one or more of large pages, wherein each large page includes a group of small pages;

updating mappings for the memory so that mappings to the one or more large pages are changed to mappings to the small pages;

tracking accesses to the small pages; and for each of the one or more large pages, determining an activity level based on the accesses to the small pages within the large page.

18. The non-transitory computer-readable storage medium of claim 17, wherein the determining is based on the total number of different small pages within the large page that have been accessed during a fixed duration of time.

19. A computer system comprising:

virtual machines executed therein; and a hypervisor configured to support execution of the virtual machines, wherein the hypervisor is configured to map a virtual memory space to a physical memory space that is partitioned and accessed as large pages and small pages, and to determine a large page that is a candidate for memory reclamation based on tracking assesses of small pages within the large page.

20. The computer system of claim 19, wherein determining that the large page is a candidate for memory reclamation comprises determining that the total number of different small pages within the large page that have been accessed during a fixed duration of time is lower than a predetermined threshold.

* * * * *